US012343744B2

(12) United States Patent
Mei et al.

(10) Patent No.: US 12,343,744 B2
(45) Date of Patent: Jul. 1, 2025

(54) SPRAY PUMP

(71) Applicant: Guangdong Neat Packaging Co., LTD., Guangdong (CN)

(72) Inventors: Yuanhong Mei, Guangdong (CN); Zhiyun Zeng, Guangdong (CN)

(73) Assignee: Guangdong Neat Packaging Co., LTD., Guangdong (CN)

( * ) Notice: Subject to any disclaimer, the term of this patent is extended or adjusted under 35 U.S.C. 154(b) by 329 days.

(21) Appl. No.: 18/300,347

(22) Filed: Apr. 13, 2023

(65) Prior Publication Data

US 2023/0347367 A1 Nov. 2, 2023

(30) Foreign Application Priority Data

Apr. 29, 2022 (CN) ......................... 202221023020.7
Sep. 13, 2022 (CN) ........................ 202222417761.X

(51) Int. Cl.
*B05B 11/10* (2023.01)

(52) U.S. Cl.
CPC ...... *B05B 11/1039* (2023.01); *B05B 11/1025* (2023.01); *B05B 11/1094* (2023.01); *B05B 11/105* (2023.01); *B05B 11/1053* (2023.01); *B05B 11/1074* (2023.01)

(58) Field of Classification Search
CPC ............ B05B 11/1039; B05B 11/1094; B05B 11/1025; B05B 11/1053; B05B 11/105; B05B 11/1074
See application file for complete search history.

(56) References Cited

U.S. PATENT DOCUMENTS 4,325,499 A * 4/1982 Shay ................... B05B 11/1039 222/321.2
4,930,999 A * 6/1990 Brunet ................ B05B 11/1018 222/321.2
5,217,148 A * 6/1993 Cater .................. B05B 11/1067 222/321.2
2004/0000567 A1* 1/2004 Greiner-Perth ..... B05B 11/1092 222/321.9
2016/0008833 A1* 1/2016 Petit .................... B05B 11/1073 222/380

* cited by examiner

*Primary Examiner* — Jeremy Carroll
(74) *Attorney, Agent, or Firm* — JCIPRNET

(57) ABSTRACT

A spray pump comprising a small piston and an upper pump rod with a liquid accumulation cavity is provided. The upper pump rod is provided with a liquid discharge hole communicates with the liquid accumulation cavity, and the small piston is provided with a sealing column for sealing the liquid discharge hole. A central column is provided with an ejector rod extending into the liquid discharge hole, and a liquid flow gap is disposed between the ejector rod and the liquid discharge hole. A central hole communicates with the liquid discharge hole is disposed at a central part of the central column, and a press head with a lower part being fixed with the central column. A press plate is fixed with the upper pump rod, and a press gap is disposed between an upper side of the press plate and a lower side of the press head.

8 Claims, 4 Drawing Sheets

SPRAY PUMP

CROSS-REFERENCE TO RELATED APPLICATION

This application claims the priority benefit of Chinese application serial no. 202221023020.7, filed on Apr. 29, 2022, and Chinese application serial no. 202222417761.X, filed on Sep. 13, 2022. The entirety of each of the above-mentioned patent applications is hereby incorporated by reference herein and made a part of this specification.

BACKGROUND

Technical Field

The present application relates to the field of spray pumps, in particular to a spray pump.

Description of Related Art

Spray pumps are widely used in daily life, for example, in shampoos, pesticides and cosmetics, etc. In general, in order to form a continuous spray, a pressure vessel is required. After filling the liquid in the pressure vessel, the inside of the vessel needs to be pressurized, therefore a vessel with a certain strength must be used to withstand the pressure inside the vessel.

The applicant has filed an application for a pressure accumulation type spray pump. In which spray pump, by providing a liquid accumulation cavity, during use, the liquid in the vessel body enters the liquid accumulation cavity and is then sprayed out through the nozzle. Then, when the liquid is not sprayed through the nozzle, the liquid accumulation cavity is in a separate state from the outside, in order to keep the liquid in the liquid accumulation cavity in a pressurized state. However, at the beginning of use, the liquid in the vessel has not yet entered the liquid accumulation cavity, and a certain amount of air remains in the accumulation cavity. Hence it is necessary to press the pump head with greater force and it is difficult or even hard to press the pump head, which deteriorates the user experience.

SUMMARY

Based on this, it is necessary to provide a spray pump against the problems in the prior art.

A spray pump, comprising a small piston and an upper pump rod, a small piston and an upper pump rod, wherein a liquid accumulation cavity is formed between the small piston and the upper pump rod, the upper pump rod is provided with a liquid discharge hole which communicates with the liquid accumulation cavity, and the small piston is provided with a sealing column for sealing the liquid discharge hole;

- a central column with an ejector rod being provided on a lower part of the central column and extending into the liquid discharge hole, wherein a liquid flow gap is disposed between the ejector rod and the liquid discharge hole, a central hole which communicates with the liquid discharge hole is disposed at a central part of the central column;
- a press head fixed with the central column at a lower part of the press head, wherein an outer liquid discharge hole connected with the central hole is disposed at a central part of the press head; and
- a press plate fixed with the upper pump rod, wherein a press gap is disposed between an upper side of the press plate and a lower side of the press head;
- wherein when the press head moves down, the central column moves down synchronously with the press head, and the ejector rod of the central column pushes the small piston downward, wherein the small piston communicates with the upper pump rod, and the liquid accumulation cavity communicates with the outside.

In one of the embodiments, an annular connection portion is disposed at an upper part of the upper pump rod, the liquid discharge hole is located inside the annular connection portion, and the press plate is fixed at an upper part of the annular connection portion.

In one of the embodiments, the central column comprises a middle annular portion socketed with the liquid discharge hole, the ejector rod is located inside the middle annular portion, and an outer side of the middle annular portion abuts an inner wall of the annular connection portion of the upper pump rod.

In one of the embodiments, the press plate comprises an upper connection portion connected with the upper pump rod; a through hole is disposed in a central part of the upper connection portion, and the central column passes through the through hole; an annular flange is disposed at an upper part of the upper connection portion, and the annular flange extends to an outside of the upper pump rod.

In one of the embodiments, an outer diameter of the ejector rod is smaller than an inner diameter of the liquid discharge hole.

In one of the embodiments, grooves are disposed in the outer side of the ejector rod.

In one of the embodiments, the spray pump further comprises:

- a main body having a hollow portion, and an upper through hole and a lower through hole are disposed at two ends of the hollow portion of the main body, respectively;
- a cover plate fixed with the main body, which seals the hollow portion of the main body from the outside at the upper through hole, and is provided with a through hole for the annular connection portion of the upper pump rod to pass through; and a reset spring located between the cover plate and the press plate.

In one of the embodiments, an upper side of the reset spring abuts a lower side of the annular flange of the press plate, and a lower side of the reset spring abuts the cover plate.

According to the above spray pump, at the beginning of pressing the press head, the central column fixed with the press head moves downward together. The central column acts on the small piston to move the small piston down a certain distance, so that the liquid accumulation cavity between the small piston and the upper pump rod is communicated with outside through the liquid discharge hole and the outer liquid discharge hole. When the subsequent liquid entering into the liquid accumulation cavity, the air in the liquid accumulation cavity can be discharged, which can avoid the problem that the air in the liquid accumulation cavity cannot be discharged. During pressing the press head, only a small external force is required to press it, which is convenient for the user to press during use.

DESCRIPTION OF THE EMBODIMENTS

In order to make the above purpose, features and advantages of the present disclosure more obvious and easier to understand, the specific embodiments of the present disclosure will be described in detail in the following in conjunction with the accompanying drawings. In the following description, many specific details are elaborated in order to fully understand the present disclosure. However, the present disclosure may be implemented in many other ways different from those described herein, and those skilled in the art may make similar improvements without violating the content of the present disclosure, so the present disclosure is not limited by the specific embodiments disclosed below.

It should be noted that when a component is said to be “fixed” to another component, it can be directly on top of another component or other components can exist in between. When a component is considered to be “connected” to another component, it can be directly connected to another component or other components can exist in between at the same time. Conversely, when a component is described as “directly on” another component, there is no intermediate component. The terms “vertical”, “horizontal”, “left”, “right” and similar expressions used herein are for illustrative purposes only.

Unless otherwise defined, all technical and scientific terms used herein have the same meaning as those normally understood by those skilled in the technical art of the present disclosure. The terms used in the specification of the present disclosure herein are only for the purpose of describing specific embodiments, and are not intended to limit the present disclosure. As used herein, the terms “and/or” include any and all combinations of one or more related items listed.

Figure 1:
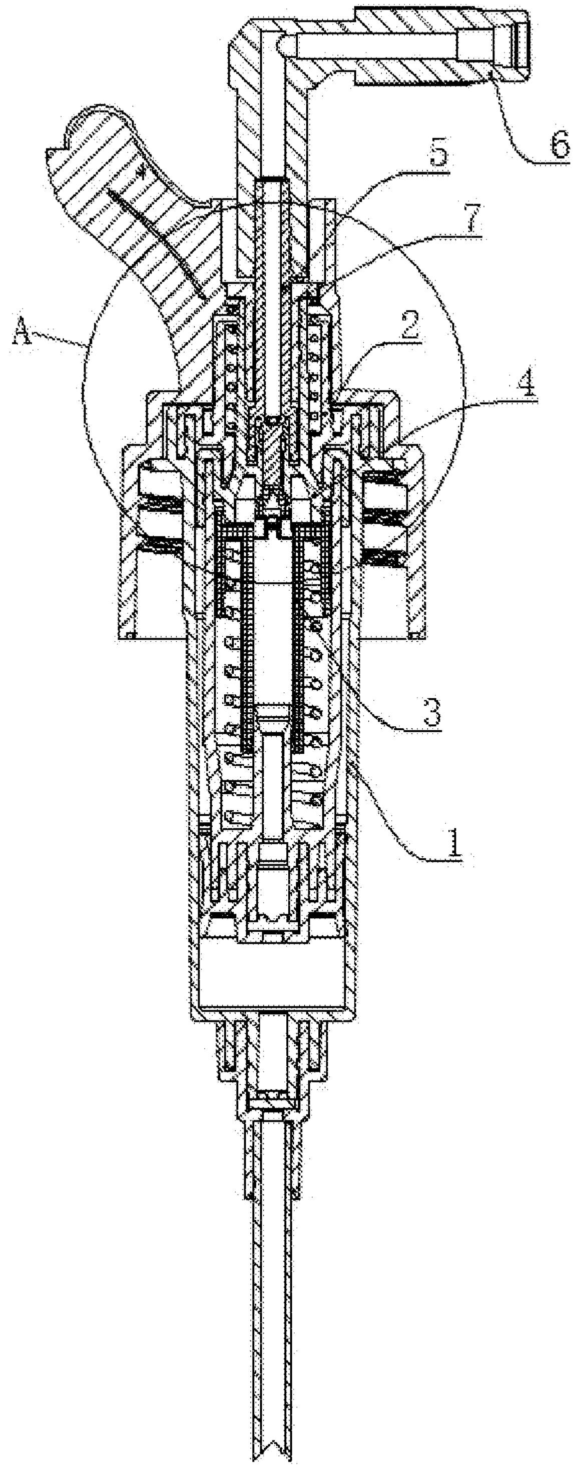
FIG. 1 is a section structure diagram of the spray pump according to the present disclosure.
Figure 2:
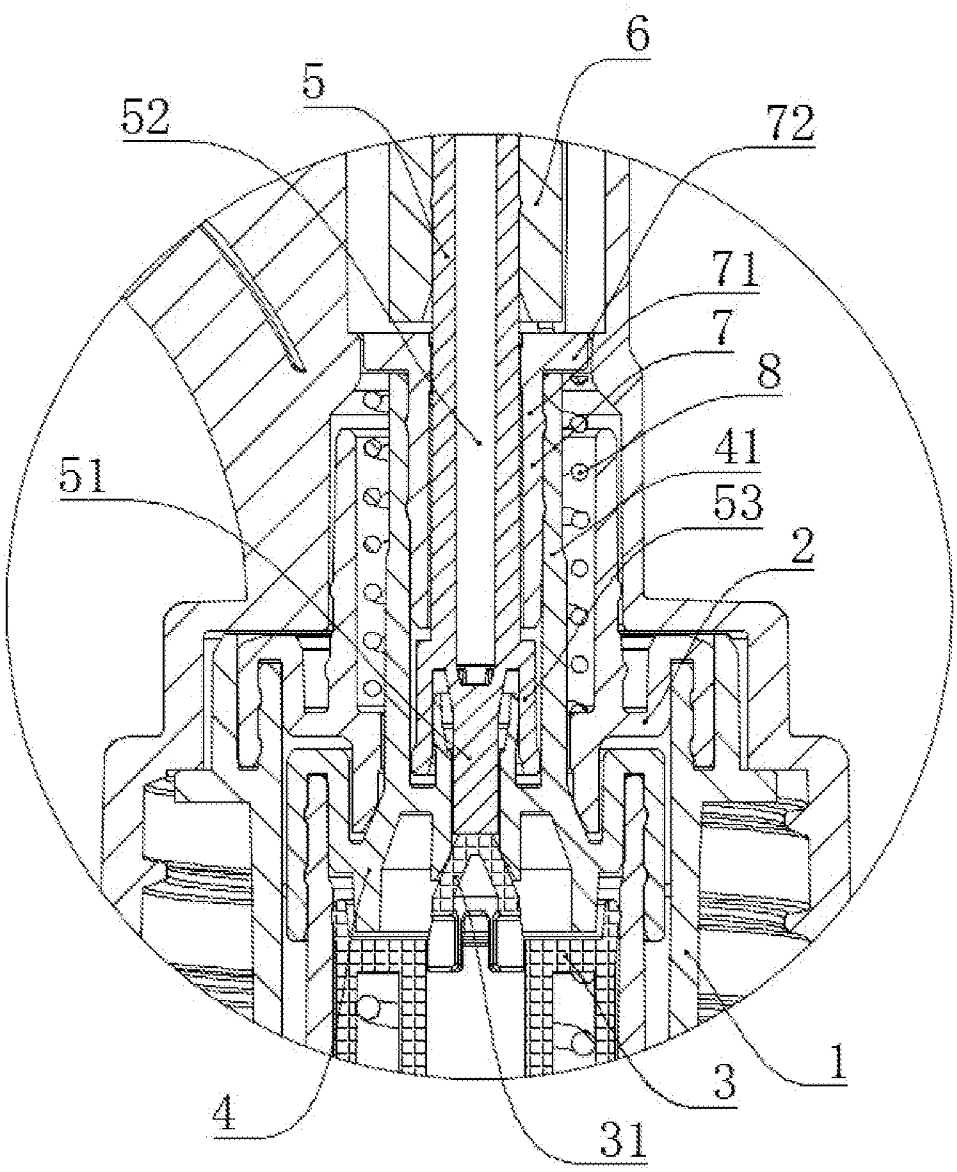
FIG. 2 is an enlarged structure diagram of at A in FIG. 1.
Figure 3:
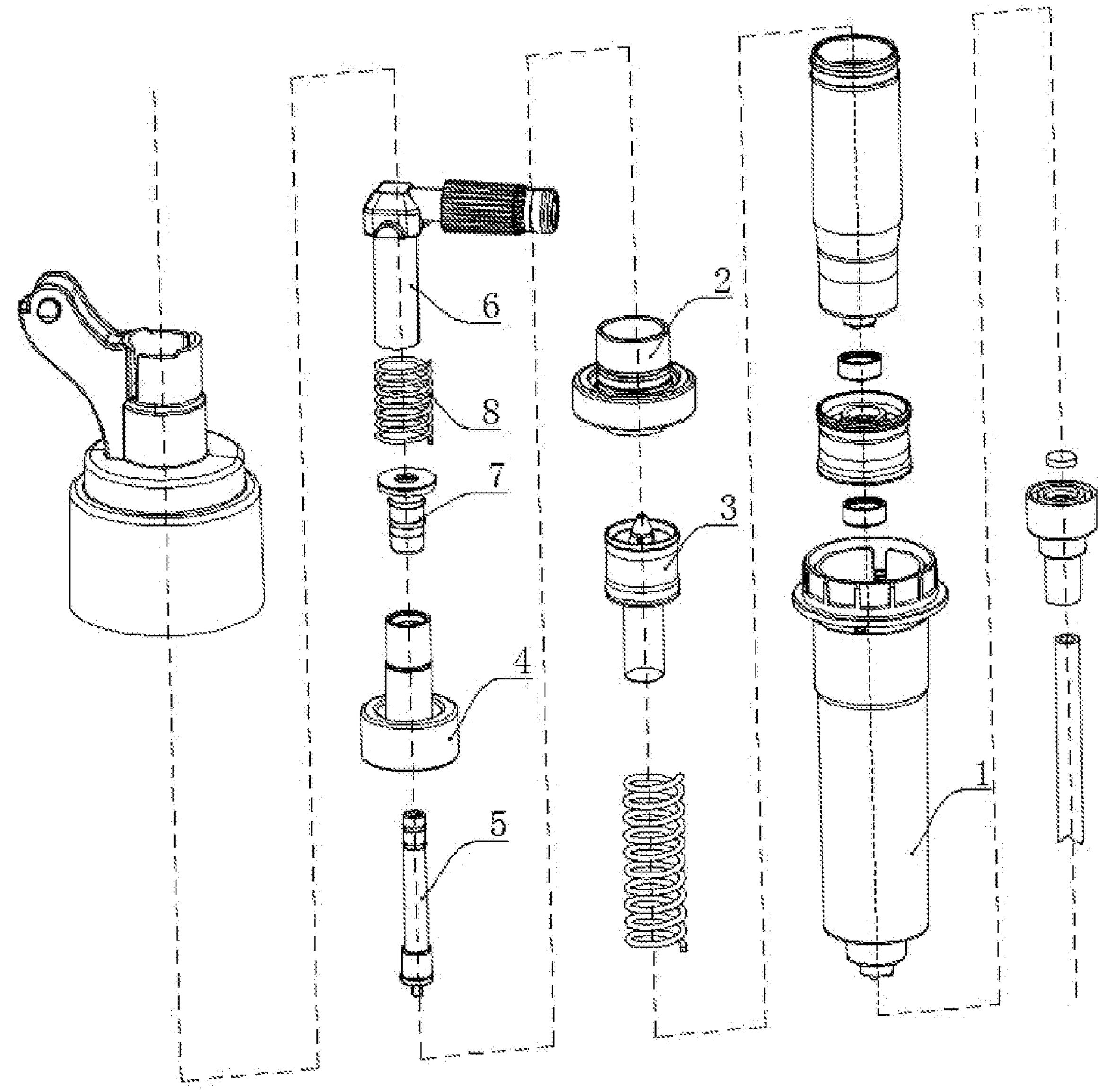
FIG. 3 is an exploded structure diagram of the spray pump according to the present disclosure.
Figure 4:
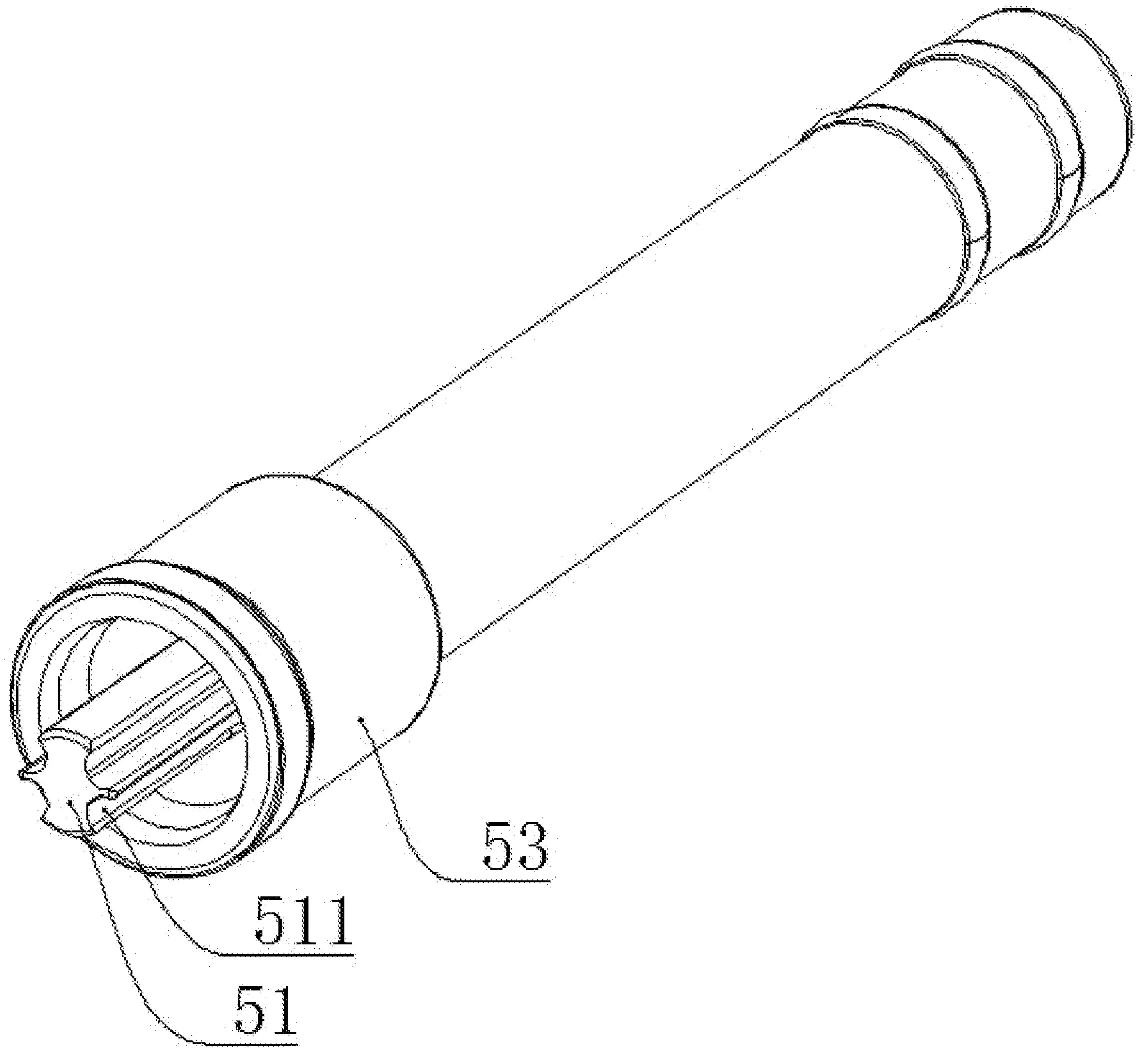
FIG. 4 is a structure diagram of the central column of the spray pump according to the present disclosure.

As shown in FIG. 1 to FIG. 4, a spray pump comprises:

a small piston 3 and an upper pump rod 4, wherein a liquid accumulation cavity is formed between the small piston 3 and the upper pump rod 4, the upper pump rod 4 is provided with a liquid discharge hole which communicates with the liquid accumulation cavity, and the small piston 3 is provided with a sealing column 31 for sealing the liquid discharge hole;

a central column 5 with an ejector rod 51 being provided on a lower part of the central column 5 and extending into the liquid discharge hole, wherein a liquid flow gap is disposed between the ejector rod 51 and the liquid discharge hole, a central hole 52 which communicates with the liquid discharge hole is disposed at a central part of the central column 5;

a press head 6 fixed with the central column 5 at a lower part of the press head 6, wherein an outer liquid discharge hole connected with the central hole 52 is disposed at a central part of the press head 6; and a press plate 7 fixed with the upper pump rod 4, wherein a press gap is disposed between an upper side of the press plate 7 and a lower side of the press head 6;

wherein when the press head 6 moves down, the central column 5 moves down synchronously with the press head 6, and the ejector rod 51 of the central column 5 pushes the small piston 3 downward, wherein the small piston 3 communicates with the upper pump rod 4, and the liquid accumulation cavity communicates with the outside.

At the beginning of pressing the press head 6, the central column 5 fixed with the press head 6 moves downward together. The central column 5 acts on the small piston 3 to move the small piston 3 down a certain distance, so that the liquid accumulation cavity between the small piston 3 and the upper pump rod 4 is communicated with outside through the liquid discharge hole and the outer liquid discharge hole. When the subsequent liquid entering into the liquid accumulation cavity, the air in the liquid accumulation cavity can be discharged, which can avoid the problem that the air in the liquid accumulation cavity cannot be discharged. During pressing the press head, only a small external force is required to press it, which is convenient for the user to press during use.

The liquid accumulation cavity is a liquid storage chamber, and the liquid in the vessel bottle body enters the liquid accumulation cavity through a plurality of structures. In the case of external force acting on the small piston 3, the space of the liquid accumulation cavity is forced to be reduced, so that the liquid in the liquid accumulation cavity is sprayed out through the liquid discharge hole, having a certain spray effect. However, at the beginning of using the spray pump, there is air in the liquid accumulation cavity. In this case, if the liquid accumulation cavity does not communicate with the outside, the liquid in the vessel body is difficult to enter the liquid accumulation cavity (if the liquid needs to enter the liquid accumulation cavity, it is necessary to compress the air in the accumulation cavity), or cannot enter the liquid accumulation cavity, which makes it necessary to press the press head 6 with a large force to make the liquid in the vessel body enters the liquid accumulation cavity, and even leads to the inability to press down the press head 6 and cannot be used. But by the adoption of the technology in the present disclosure, when the press head 6 is pressed down, under the action of the press head 6, the central column 5 moves down, so that a gap is formed between the small piston 3 and the upper pump rod 4, and the liquid accumulation cavity communicates with the outside through the liquid discharge hole. When continuing to press the press pump to allow the liquid in the vessel body enters the liquid accumulation cavity, because the liquid accumulation cavity communicates with the outside, the liquid can easily discharge the air in the liquid accumulation cavity, and the liquid enters the liquid accumulation cavity. The air in the liquid accumulation cavity is not compressed, therefore it is easy to press the press head 6, so that the spray pump can be easily used.

In this case, a press gap is disposed between the upper side of the press plate 7 and the lower side of the press head 6, and the height of this press gap is the height of the downward movement of the central column 5 at the beginning. If the sealing column 31 of the small piston 3 extends into the liquid discharge hole, then the press gap is greater than the height of the sealing column 31 extending into the liquid discharge hole, so that the sealing column 31 can be moved to a gap formed with the liquid discharge hole, and the accumulation cavity is communicated with the outside. If the sealing column 31 of the small piston 3 abuts the liquid discharge hole, that is, as long as the small piston 3 is affected and moved down, there will be a gap between the sealing column 31 and the liquid discharge hole, thereby communicating the liquid accumulation cavity with the outside.

The central column 5 needs to be moved up and down in the position where the upper part of the upper pump rod 4 is located, thus in this embodiment, an annular connection portion 41 is disposed at the upper part of the upper pump rod 4. The liquid discharge hole is located inside the annular connection portion 41, and the press plate 7 is fixed at an upper part of the annular connection portion 41. In this case, the central column 5 is inserted into the annular connection portion 41 of the upper pump rod 4, and the ejector rod 51 on the lower side of the central column is inserted into the liquid hole.

For the central column 5, the small piston 3 is pushed down during the downward movement of the central column 5, and it is also necessary to ensure that the liquid passing therethrough does not leak. Thus, in this embodiment, the central column 5 comprises a middle annular portion 53 socketed with the liquid discharge hole, the ejector rod 51 is located inside the middle annular portion, and an outer side of the middle annular portion 53 abuts an inner wall of the annular connection portion 41 of the upper pump rod 4. By abutting the outer side of the middle annular portion 53 with the inner wall of the annular connection portion 41 of the upper pump rod 4, the liquid passing through the position of the middle annular portion 53 will not leak to the outside of the central column 5. Furthermore, in this case the outer wall of the liquid discharge hole abuts the inner wall of the middle annular portion 53, the sealing effect is further increased.

The press plate 7 serves as a movable transfer structure for transferring the movement of the press head 6 to the upper pump rod 4. Thus, in this embodiment, the press plate 7 comprises an upper connection portion 71 connected with the upper pump rod 4. A through hole is disposed in a central part of the upper connection portion 71, and the central column 5 passes through the through hole. An annular flange 72 is disposed at an upper part of the upper connection portion 71, and the annular flange 72 extends to the outside of the upper pump rod 4. The central column moves up and down at the position of the through hole inside the upper connection portion 71 of the press plate 7, and the press head 6 is disposed at the upper part of the central column 5. When the press head 6 moves down, the press head 6 acts on the annular flange 72 of the press plate 7, thereby pressing down the annular flange 72 and the upper pump rod 4 fixed with the annular flange 72 (press plate 7).

During the press head 6 moving up and down, the ejector rod 51 is in the liquid discharge hole, and at the same time the ejector rod 51 acts on the sealing column 31 of the small piston 3, so that the liquid accumulation cavity is communicated with the liquid discharge hole, thereby the air and liquid in the liquid accumulation cavity can pass through the liquid discharge hole, the central hole 52, and the outer liquid discharge hole, and then be sprayed out. The ejector rod 51 is in the liquid discharge hole, so in order not to affect the flow of air and liquid, the outer diameter of the ejector rod 51 is smaller than the inner diameter of the liquid discharge hole, thereby forming a flow gap to ensure the normal flow of air and liquid.

In order to increase the flow speed of air and liquid, in the present embodiment, the ejector rod 51 is provided with grooves 511 on the outside. By adding grooves 511, without affecting the ejector rod 51 pushing the small piston 3, the gap between the ejector rod 51 and the inner wall of the liquid discharge hole can be increased, thereby increasing the flow speed of air and liquid.

After pressing the press head 6 down, in order to rest the press head 6, in the present embodiment, the following configuration is adopted: the spray pump further comprises a main body 1 having a hollow portion, an upper through hole and a lower through hole are disposed at the two ends of the hollow portion of the main body 1; a cover plate 2 fixed with the main body 1, which seals the hollow portion of the main body 1 from the outside at the upper through hole, and the cover plate 2 is provided with a through hole for the annular connection portion 41 of the upper pump rod 4 to pass through; and a reset spring 8 located between the cover plate 2 and the press plate 7. Further, an upper side of the reset spring 8 abuts a lower side of the annular flange 72 of the press plate 7, and a lower side of the reset spring 8 abuts the cover plate 2. In this case, the reset spring 8 is located between the cover plate 2 and the annular flange 72 of the press plate 7. The press head 6 is pressed down, and the press plate 7 is moved down, thereby compressing the reset spring 8. After removing the downward force on the press head 6, under the action of the reset spring 8, the press plate 7, the upper pump rod 4 fixed with the press plate 7, and the pressure head 6 on the upper part of the press plate 7 are all moved up, so that the press plate 7, the upper pump rod 4, and the press head 6 are restored to their original positions.

Other structures of the spray pump are the same as those of the pressure accumulation type spray pump applied previously by the applicant, therefore, it is not described in detail here.

The technical features of the embodiments described above may be arbitrarily combined, and for the sake of conciseness, not all possible combinations of the technical features in the above embodiments are described. However, as long as there is no contradiction in the combination of these technical features, they should be considered to be within the scope of the present description.

The above embodiments only express several embodiments of the present disclosure, and their description is more specific and detailed, but it cannot be understood as a limitation on the scope of the disclosure. It should be noted that for those of ordinary skill in the art, without departing from the principles of the present disclosure, certain modifications and improvements may also be made, and these also fall within the scope of protection of the present disclosure. Therefore, the scope of protection of this disclosure shall be subject to the attached claims.

REFERENCE SIGNS LIST

1. Main body; 2. Cover plate; 3. Small piston; 31. Sealing column; 4. Upper pump rod; 41. Annular connection portion; 5. Central column; 51. Ejector rod; 511. Groove; 52. Central hole; 53. Middle annular portion; 6. Press head; 7. Press plate; 71. Upper connection portion; 72. Annular flange; 8. Reset spring.

What is claimed is:

1. A spray pump, comprising:

a small piston and an upper pump rod, wherein a liquid accumulation cavity is formed between the small piston and the upper pump rod, the upper pump rod is provided with a liquid discharge hole which communicates with the liquid accumulation cavity, and the small piston is provided with a sealing column for sealing the liquid discharge hole;

a central column with an ejector rod being provided on a lower part of the central column and extending into the liquid discharge hole, wherein a liquid flow gap is disposed between the ejector rod and the liquid discharge hole, a central hole which communicates with the liquid discharge hole is disposed at a central part of the central column;

a press head fixed with the central column at a lower part of the press head, wherein an outer liquid discharge hole connected with the central hole is disposed at a central part of the press head; and a press plate fixed with the upper pump rod, wherein a press gap is disposed between an upper side of the press plate and a lower side of the press head;

wherein when the press head moves down, the central column moves down synchronously with the press head, and the ejector rod of the central column pushes the small piston downward, wherein the small piston communicates with the upper pump rod, and the liquid accumulation cavity communicates with the outside.

2. The spray pump according to claim 1, wherein an annular connection portion is disposed at an upper part of the upper pump rod, the liquid discharge hole is located inside the annular connection portion, and the press plate is fixed at an upper part of the annular connection portion.

3. The spray pump according to claim 2, wherein the central column comprises a middle annular portion socketed with the liquid discharge hole, the ejector rod is located inside the middle annular portion, and an outer side of the middle annular portion abuts an inner wall of the annular connection portion of the upper pump rod.

4. The spray pump according to claim 3, wherein the press plate comprises an upper connection portion connected with the upper pump rod; a through hole is disposed in a central part of the upper connection portion, and the central column passes through the through hole; an annular flange is disposed at an upper part of the upper connection portion, and the annular flange extends to an outside of the upper pump rod.

5. The spray pump according to claim 4, wherein an outer diameter of the ejector rod is smaller than an inner diameter of the liquid discharge hole.

6. The spray pump according to claim 4, wherein grooves are disposed in the outer side of the ejector rod.

7. The spray pump according to claim 4, wherein the spray pump further comprises:

a main body having a hollow portion, and an upper through hole and a lower through hole are disposed at two ends of the hollow portion of the main body, respectively;

a cover plate fixed with the main body, which seals the hollow portion of the main body from the outside at the upper through hole, and is provided with a through hole for the annular connection portion of the upper pump rod to pass through; and a reset spring located between the cover plate and the press plate.

8. The spray pump according to claim 7, wherein an upper side of the reset spring abuts a lower side of the annular flange of the press plate, and a lower side of the reset spring abuts the cover plate.

* * * * *